United States Patent
Kimura et al.

(10) Patent No.: US 8,993,475 B2
(45) Date of Patent: Mar. 31, 2015

(54) OXYGEN STORAGE MATERIAL

(75) Inventors: Mareo Kimura, Kakegawa (JP); Keiichi Narita, Kakegawa (JP); Akimasa Hirai, Kakegawa (JP); Akiya Chiba, Kakegawa (JP); Naoto Miyoshi, Toyota (JP); Kazunobu Ishibashi, Toyota (JP); Takaaki Kanazawa, Toyota (JP); Takeru Yoshida, Nishikamo-gun (JP); Hirohisa Tanaka, Ikeda (JP); Mari Uenishi, Ikeda (JP); Isao Tan, Ikeda (JP); Masashi Taniguchi, Ikeda (JP)

(73) Assignees: Cataler Corporation, Shizuoka-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/307,571
(22) PCT Filed: Jun. 22, 2007
(86) PCT No.: PCT/JP2007/062598
  § 371 (c)(1),
  (2), (4) Date: Jan. 5, 2009
(87) PCT Pub. No.: WO2008/004452
  PCT Pub. Date: Jan. 10, 2008

(65) Prior Publication Data
  US 2010/0004123 A1  Jan. 7, 2010

(30) Foreign Application Priority Data
  Jul. 6, 2006 (JP) .................. 2006-187137

(51) Int. Cl.
  *B01J 23/10* (2006.01)
  *B01D 53/94* (2006.01)
  (Continued)

(52) U.S. Cl.
  CPC .............. *C01G 25/02* (2013.01); *B01D 53/02* (2013.01); *B01J 23/002* (2013.01);
  (Continued)

(58) Field of Classification Search
  CPC ........ C01G 25/02; B01J 23/002; B01J 23/63; B01D 53/02; B01D 2253/112; B01D 2253/20; B01D 2255/407; C01P 2004/82
  USPC .................. 502/304, 325, 326, 328, 349, 526
  IPC . B01J 23/63, 23/10, 23/16, 37/04, 32/00; B01D 53/94
  See application file for complete search history.

(56) References Cited

U.S. PATENT DOCUMENTS

| 6,348,430 B1 | 2/2002 | Lindner et al. |
| 6,881,384 B1 | 4/2005 | Uenishi et al. |

(Continued)

FOREIGN PATENT DOCUMENTS

| EP | 1 859 864 A1 | 11/2007 | |
| FR | EP0834348 | * 4/1998 | ............... B01J 23/10 |

(Continued)

OTHER PUBLICATIONS

Machine translation of Shimizu (JP2006-116460).*

(Continued)

*Primary Examiner* — Jun Li
(74) *Attorney, Agent, or Firm* — John P. White; Cooper & Dunham LLP

(57) ABSTRACT

An excellent oxygen storage capacity is achieved even in the case used for a long period of time under high temperature conditions. An oxygen storage material contains a first particle made of a composite oxide of cerium and zirconium or a composite oxide of cerium, a rare-earth element other than cerium and zirconium, a second particle including a composite oxide of a rare-earth element, an alkaline-earth element and zirconium, and a precious metal. A part of the precious metal forms a solid solution with the composite oxide included in the second particle.

10 Claims, 4 Drawing Sheets

(51) Int. Cl.
  *C01G 25/02* (2006.01)
  *B01D 53/02* (2006.01)
  *B01J 23/00* (2006.01)
  *B01J 23/63* (2006.01)

(52) U.S. Cl.
  CPC .... *B01D 2253/112* (2013.01); *B01D 2255/407* (2013.01); *B01D 2256/12* (2013.01); *B01D 2259/4525* (2013.01); *B01J 23/63* (2013.01); *B01J 2523/00* (2013.01); *C01P 2002/72* (2013.01); *C01P 2002/85* (2013.01); *C01P 2004/82* (2013.01); *C01P 2006/12* (2013.01); *Y10S 502/526* (2013.01)
  USPC ........... 502/304; 502/325; 502/326; 502/328; 502/349; 502/526

(56) References Cited

U.S. PATENT DOCUMENTS

| | | | |
|---|---|---|---|
| 2002/0015674 A1* | 2/2002 | Taniguchi et al. | 423/213.2 |
| 2004/0235651 A1* | 11/2004 | Uenishi et al. | 502/304 |
| 2005/0215428 A1* | 9/2005 | Matsueda et al. | 502/328 |
| 2006/0089256 A1 | 4/2006 | Shimizu et al. | |
| 2008/0182746 A1* | 7/2008 | Matsueda et al. | 502/302 |
| 2008/0318770 A1* | 12/2008 | Matsueda et al. | 502/303 |

FOREIGN PATENT DOCUMENTS

| | | |
|---|---|---|
| JP | 06-075675 | 9/1994 |
| JP | 09-225266 | 9/1997 |
| JP | 10-182155 | 7/1998 |
| JP | 10-338525 | 12/1998 |
| JP | 11-021171 | 1/1999 |
| JP | 2000-169148 | 6/2000 |
| JP | 2001-062295 | 3/2001 |
| JP | 2002-172325 | 6/2002 |
| JP | 2004-174490 | 6/2004 |
| JP | 2006-116460 | 5/2006 |
| JP | 2006-169021 | 6/2006 |
| WO | WO-03/035256 A2 | 5/2003 |
| WO | WO-2005/102933 A2 | 11/2005 |

OTHER PUBLICATIONS

European Search Report mailed May 23, 2011, for EP Application No. 07767407.5, seven pages.

Oct. 18, 2011 official action (with English translation) in connection with Japanese patent application No. 2008-523644.

Notification of the First Office Action mailed Nov. 12, 2010, for CN Patent Application No. 200780025704.2, with English Translation, 11 pages.

* cited by examiner

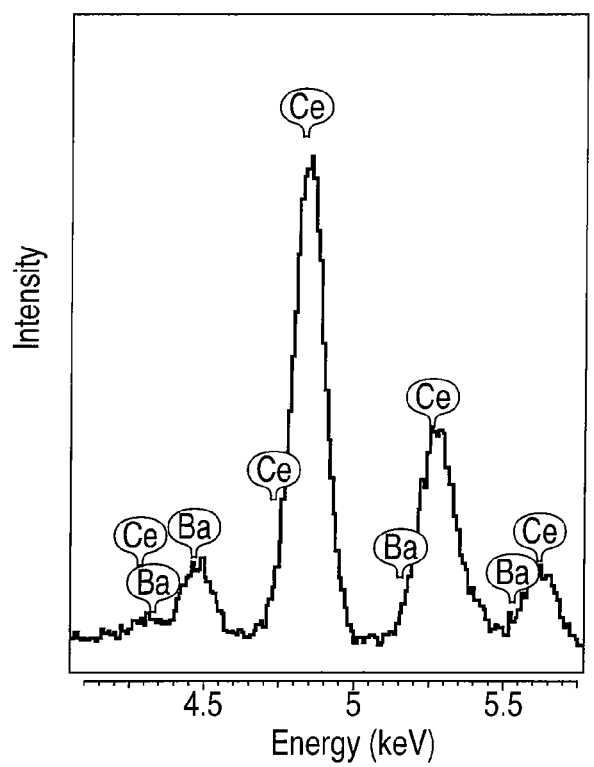
F I G. 5
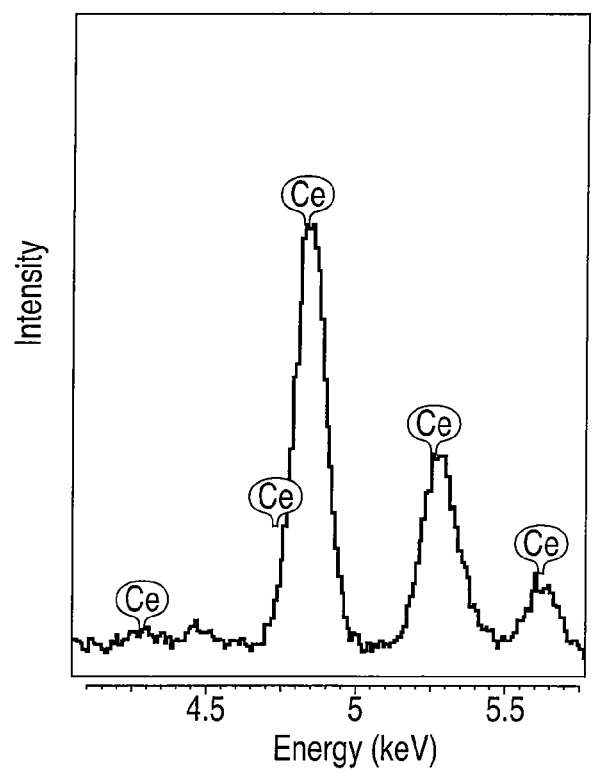
F I G. 6

OXYGEN STORAGE MATERIAL

CROSS-REFERENCE TO RELATED APPLICATIONS

This application is a United States National Stage Application under 35 U.S.C. §371 of International Patent Application No. PCT/JP2007/062598, filed Jun. 22, 2007, which claims the benefit to Japanese Patent Application No. 2006-187137, filed Jul. 6, 2006, each of which is incorporated by reference into this application as if fully set forth herein.

TECHNICAL FIELD

The present invention relates to an oxygen storage material, in particular, to an oxygen storage material suitable for use in an exhaust gas-purifying catalyst.

BACKGROUND ART

As an exhaust gas-purifying catalyst that treats exhaust gas of an automobile, a three-way catalyst with precious metal supported by an inorganic oxide such as cerium oxide has been widely used. In the three-way catalyst, the precious metal plays the role in promoting the reduction of nitrogen oxides and the oxidations of carbon monoxide and hydrocarbons. Further, the inorganic oxide plays the roles in increasing the specific surface area of the precious metal and suppressing the sintering of the precious metal by dissipating heat generated by the reactions. In particular, cerium oxide has an oxygen storage capacity and is capable of optimizing the oxidation and reduction reactions.

However, when the three-way catalyst is used under high temperature conditions, the crystal grains of cerium oxide grow in size. As a result, the surface area of cerium oxide decreases. Decrease in the surface area of cerium oxide causes decrease in oxygen storage capacity. For this reason, various researches and developments have been conducted in order to improve heat stability of cerium oxide.

For example, JP-B 6-75675 describes an exhaust gas-purifying catalyst that contains a composite oxide of cerium and zirconium. JP-A 2000-169148 describes that a composite oxide of cerium, zirconium and yttrium is used. JP-A 11-21171 describes that an exhaust gas emitted by an internal combustion engine is purified using an oxygen storage material made of a composite oxide of cerium and at least one of praseodymium, lanthanum, yttrium and neodymium.

These composite oxides are superior to cerium oxide in terms of heat stability. Therefore, these composite oxides can deliver excellent oxygen storage capacity for a long period of time.

However, the present inventors have found the following facts in the course of achieving the present invention. When three-way catalysts using the above composite oxides are used for a long period of time under high temperature conditions, for example, at 1,000° C. or higher, growth of precious metal particles occurs, though growth of the composite oxide particles is less prone to occur. In addition, the oxygen storage capacities of the composite oxides decrease as the precious metal particles grow.

DISCLOSURE OF INVENTION

An object of the present invention is to provide an oxygen storage material that delivers an excellent oxygen storage capacity even in the case where used for a long period of time under high temperature conditions.

According to an aspect of the present invention, there is provided an oxygen storage material comprising a first particle made of a composite oxide of cerium and zirconium or a composite oxide of cerium, a rare-earth element other than cerium and zirconium, a second particle including a composite oxide of a rare-earth element, an alkaline-earth element and zirconium, and a precious metal, a part of the precious metal forming a solid solution with the composite oxide included in the second particle.

BRIEF DESCRIPTION OF DRAWINGS

FIG. 5 is a graph showing an elementary analysis spectrum obtained using EDX for a particle shown in FIG. 4; and FIG. 6 is a graph showing an elementary analysis spectrum obtained using EDX for another particle shown in FIG. 4.

BEST MODE FOR CARRYING OUT THE INVENTION

An embodiment of the present invention will be described below.

Figure 1:
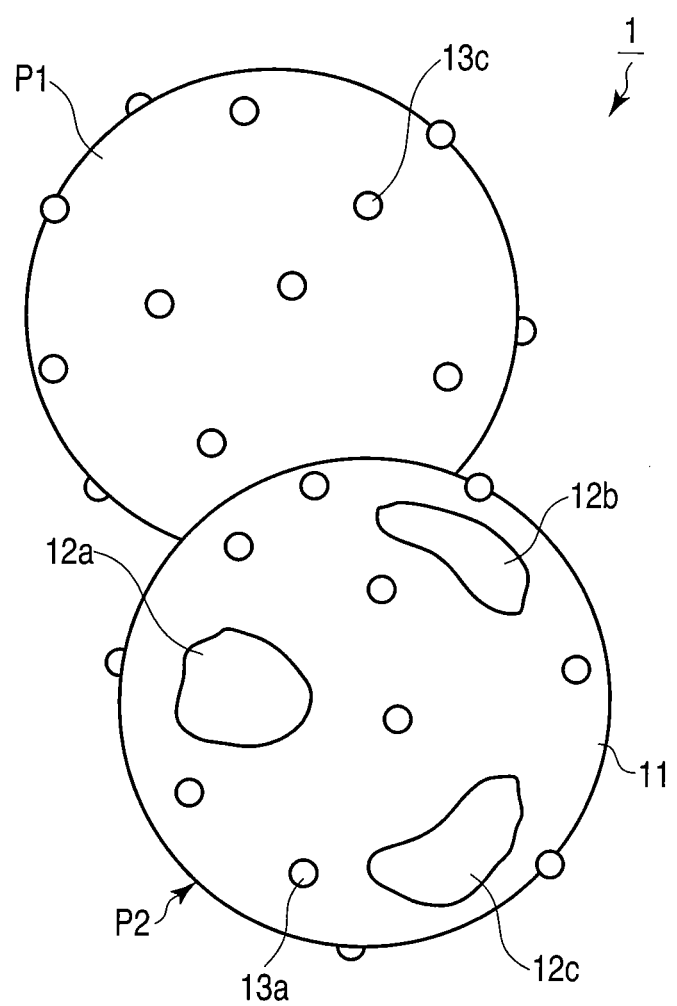
FIG. 1 is a view schematically showing an oxygen storage material according to an embodiment of the present invention.

FIG. 1 is a view schematically showing an oxygen storage material according to an embodiment of the present invention.

The oxygen storage material 1 includes first particles P1 and second particles P2. Note that in FIG. 1, a single particle is depicted for the first particles P1 and another single particle is depicted for the second particles P2 for simplification.

The first particle P1 is made of a composite oxide of cerium and zirconium or a composite oxide of cerium, a rare-earth element other than cerium and zirconium. Typically, the composite oxide and a precious metal described later do not form a solid solution.

The first particle P1 is less prone to cause a growth due to heating as compared with the second particle P2. That is, the first particle P1 is excellent in heat stability as compared with the second particle P2.

The first particle P1 supports a precious metal 13c. As the precious metal 13c, an element of platinum group including platinum, palladium, rhodium, etc. can be used, for example. As the precious metal 13c, a precious metal element or precious metal elements may be used. Here, as an example, it is supposed that platinum (Pt) is used as the precious metal 13c.

The second particle P2 contains a support 11, composite oxides 12a to 12c partially covering its surface, and a precious metal (not shown).

The support 11 contains an oxide of a rare-earth element as a main component. The support 11 may further contain zirconia ($ZrO_2$), for example. The support 11 may contain a composite oxide of a rare-earth element and zirconium as a main component.

The composite oxide 12a contains a composite oxide of a rare-earth element and an alkaline-earth element as a main component. The composite oxide 12b contains a composite oxide of zirconium and an alkaline-earth element as a main component. The composite oxide 12c contains a composite oxide of a rare-earth element, zirconium and an alkaline-earth element as a main component.

The rare-earth elements contained in the composite oxides 12a and 12c are the same as the rare-earth element contained in the support 11, and the composite oxides 12a to 12c contains the same alkaline earth-element. The composite oxides 12a to 12c contain the same precious metal as the precious metal 13c, and each of the composite oxides 12a to 12c together with the precious metal form a solid solution.

Here, as an example, it is supposed that the support contains ceria ($CeO_2$) as main component, the composite oxide 12a is made of a composite oxide represented by the chemical formula $BaCeO_3$, the composite oxide 12b is made of a composite oxide represented by the chemical formula $BaZrO_3$, and the composite oxide 12c is made of a composite oxide represented by the chemical formula $Ba(Zr,Ce)O_3$. Also, the precious metal contained in the composite oxides 12a to 12c is supposed to be platinum (Pt). That is, it is supposed that cerium is used as the rare-earth element, barium is used as the alkaline-earth element, and platinum is used as the precious metal. Note that the solid solution of the composite oxide 12a and platinum can be represented, for example, by the chemical formula $Ba(Ce,Pt)O_3$, the solid solution of the composite oxide 12b and platinum can be represented, for example, by the chemical formula $Ba(Zr,Pt)O_3$, and the solid solution of the composite oxide 12c and platinum can be represented, for example, by the chemical formula $Ba(Zr,Ce,Pt)O_3$.

The second particle P2 supports a precious metal 13a. The precious metal 13a is the same as the precious metal 13c and the precious metal contained in the composite oxide 12a to 12c. It is possible that the second particle P2 does not support the precious metal 13a.

The oxygen storage material 1 can be used, for example, as an exhaust gas-purifying catalyst for purifying an exhaust gas emitted by a combustion engine such as gasoline engine and diesel engine or as a part of the catalyst. For example, a pellet catalyst including the oxygen storage material 1 may be manufactured and used as an exhaust gas-purifying catalyst. Alternatively, a monolith catalyst may be manufactured, for example, by coating a monolith honeycomb substrate with slurry containing the oxygen storage material 1 and used as an exhaust gas-purifying catalyst.

The oxygen storage material 1 exhibits a reversible change in state when a composition of an atmosphere is changed under high temperature conditions. This will be described with reference to an example in which the oxygen storage material 1 is used in an exhaust gas-purifying catalyst.

Figure 2:
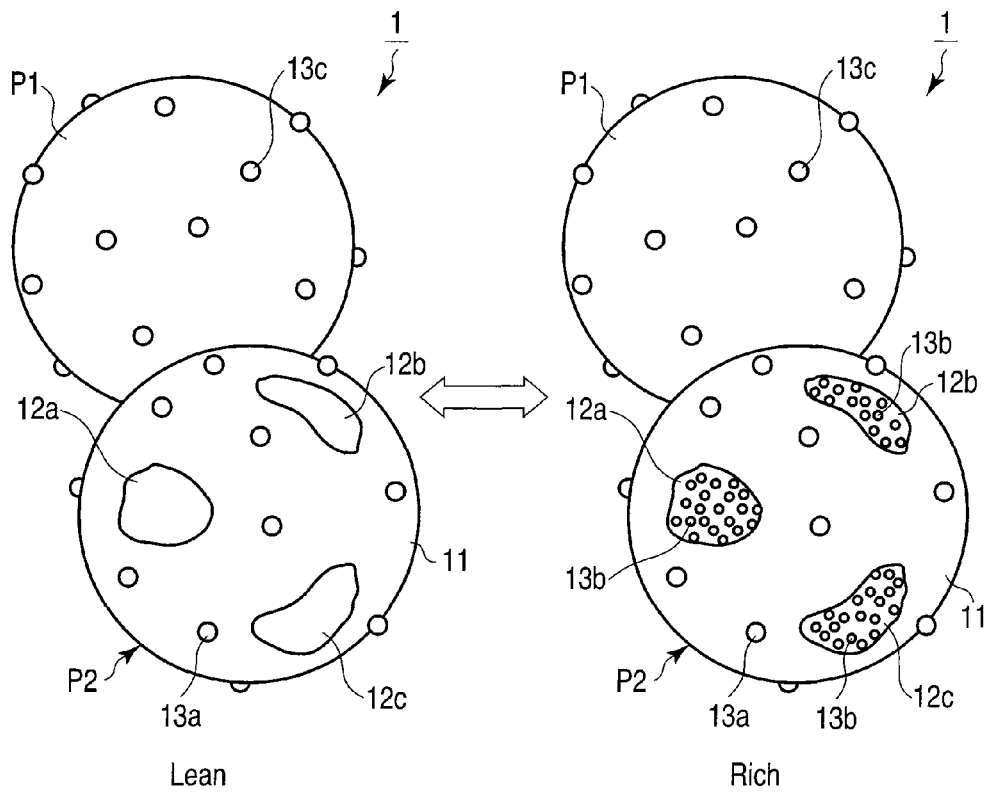
FIG. 2 is a conceptual view schematically showing a state change that the oxygen storage material shown in FIG. 1 exhibits under high temperature conditions.

FIG. 2 is a conceptual view schematically showing a state change that the oxygen storage material shown in FIG. 1 exhibits under high temperature conditions. In FIG. 2, the state indicated as "Lean" shows the state that the oxygen storage material 1 exhibits when exposed to an atmosphere with a high oxygen concentration under high temperature conditions such as temperature conditions of 1,000° C. to 1,200° C., for example, when the fuel supply to an engine is cut off. The state indicated as "Rich" shows the state that the oxygen storage material 1 exhibits when exposed to an atmosphere with a low oxygen concentration under high temperature conditions such as temperature conditions of 1,000° C. to 1,200° C., for example, when an abundance of fuel is continuously supplied to an engine.

In the state indicated as "Lean" in FIG. 2, the first particle P1 and the second particle P2 store oxygen. The precious metals 13c and 13a play the roles of promoting the oxygen storage of the particles P1 and P2, respectively.

When the oxygen concentration of the atmosphere is decreased under the above-described high temperature conditions, the first particle P1 and the second particle P2 emit oxygen stored therein. In addition, the oxygen storage material 1 causes the state change from the state indicated as "Lean" to the state indicated as "Rich". Specifically, platinum precipitates out of the composite oxides 12a to 12c, and the precipitated platinum form the precious metals 13b on the surfaces of the composite oxides 12a to 12c.

The precious metals 13b are much smaller in size than the precious metals 13a and 13b. For example, the size of the precious metal 13b is several nanometers or less, while the sizes of the precious metals 13a and 13c are several tens of nanometers.

Thus, the oxygen storage material 1 shown in FIG. 1 exhibits a reversible state change when the composition of the atmosphere is changed under high temperature conditions. Further, every time the oxygen concentration of the atmosphere is decreased, the precious metals 13b small in size are formed on the surfaces of the composite oxides 12a to 12c.

The oxygen storage material 1 is less prone to cause reduction in oxygen storage capacity. The reason is presumed as follows.

When the oxygen storage material 1 from which the second particle P2 is omitted is exposed to a high temperature atmosphere, for example, at 1,000° C. or higher, aggregation of the precious metals 13c and the like occurs. As a result, the size of the precious metal 13c increases. For this reason, an oxygen storage material not containing the second particle P2 is prone to cause reduction in oxygen storage capacity.

As described with reference to FIG. 2, the oxygen storage material 1 forms the precious metals 13b small in size on the surfaces of the composite oxides 12a to 12c every time the oxygen concentration of the atmosphere is decreased. In addition, an automotive vehicle changes the oxygen concentration in the exhaust gas at relatively close intervals. Thus, the sizes of the precious metals 13b on the composite oxides 12a to 12c cannot increase. Further, the precious metals 13b small in size are prone to cause evaporation as compared with the precious metals 13a and 13c larger in size. The evaporated precious metal is deposited on the particles P1 and P2 to form particles small in size. Therefore, the oxygen storage material 1 shown in FIG. 1 is less prone to cause reduction in oxygen storage capacity as compared with an oxygen storage material not containing the second particle P2.

Note that when the oxygen storage material 1 from which the first particle P1 is omitted is exposed to a high temperature atmosphere, the size of the precious metal 13b does not increase. However, the second particle P2 is inferior in heat stability as compared with the first particle P1. Thus, an oxygen storage material not containing the first particle P1 is prone to cause growth of the second particle 2. When the second particle P2 grows, the specific surface area thereof decreases. Therefore, an oxygen storage material not containing the first particle P1 is prone to cause reduction in oxygen storage capacity.

The oxygen storage material 1 shown in FIG. 1 includes the first particle P1 excellent in heat stability in addition to the second particle P2. The first particle P1 plays the role of suppressing the growth of the second particle P2. Therefore, the oxygen storage material 1 shown in FIG. 1 is less prone to cause reduction in oxygen storage capacity as compared with an oxygen storage material not containing the first particle P1.

In the first particle P1, one or more of praseodymium, lanthanum, yttrium and neodymium can be uses as the rare-earth element other than cerium, for example.

In the composite oxide of cerium and zirconium used in the first particle P1, the atomic ratio of cerium with respect to the sum of cerium and zirconium is set within a range of 0.05 to 0.7, for example. Also, in the composite oxide of cerium, a rare-earth element other than cerium and zirconium, the atomic ratio of cerium with respect to the sum of cerium, the rare-earth element other than cerium and zirconium is set, for example, within a range of 0.3 to 0.7, and typically within a range of 0.4 to 0.6. The atomic ratio of the rare-earth element other than cerium with respect to cerium is set, for example, within a range of 0.06 to 0.27, and typically within a range of 0.11 to 0.25.

In the second particle P2, one or more of cerium, lanthanum, praseodymium and neodymium can be used as the rare-earth element, for example. As the alkaline-earth element, one or more of barium, strontium, calcium and magnesium can be used, for example.

In the second particle P2, the atomic ratio of the alkaline-earth element is set, for example, at 0.1 atomic % or higher, and typically at 5 atomic % or higher. Also, the atomic ratio is set, for example, at 15 atomic % or lower, and typically at 10 atomic % or lower. In the case where the atomic ratio is small, the volume ratio of the composite oxides 12a to 12c with respect to the support 11 is small. Thus, it is possible that the effect of suppressing the growth of the precious metal particles is insufficient. Also, in the case where the atomic ratio is increased excessively, it is possible that the heat stability of the second particle P2 becomes insufficient.

The weight ratio of the first particle P1 with respect to the second particle P2 is set, for example, within a range of 99/1 to 1/99, and typically within a range of 80/20 to 40/60. In the case where the ratio is small, it is possible that the effect of suppressing the growth of the second particle P2 is insufficient. Also, in the case where the ratio is large, it is possible that the effect of suppressing the growth of precious metal particles is insufficient.

As the precious metals 13a to 13c, an element of platinum group including platinum, palladium, rhodium, etc. can be used, for example. As each of the precious metals 13a to 13c, an element or elements may be used.

The precious metal content of the oxygen storage material 1 is set, for example, within a range of 0.001% to 5% by weight, and typically within a range of 0.1% to 1% by weight. When the precious metal content is small, the effect of the precious metal to promote the oxygen storage of the particles P1 and P2 is small. When the precious metal content is large, the growth of the precious metal particle is prone to occur.

The oxygen storage material 1 can be manufactured, for example, by the following method.

In the case where first particles P1 made of cerium and zirconium are to be manufactured, a solution of a cerium salt and a zirconium salt is prepared. In the case where first particles P1 made of a composite oxide of cerium, a rare-earth element other than cerium and zirconium are to be manufactured, a solution of a cerium salt, a salt of a rare-earth element other than cerium and a zirconium salt is prepared.

Subsequently, ammonium hydroxide is dropped into the solution to cause coprecipitation, for example. Thereafter, the precipitate is separated from the solution, and washing and drying thereof are performed.

Then, the dried precipitate is calcined in an oxidizing atmosphere. The temperature of the calcination is set, for example, within a range of 400° C. to 600° C. Further, the calcined product is crushed, and then fired in an oxidizing atmosphere. The temperature of the firing is set, for example, within a range of 700° C. to 1,000° C. Thus, the first particles P1 are obtained.

Next, manufacture of the second particles P2 will be described.

A solution of a salt of a rare-earth element and a zirconium salt is prepared. Subsequently, ammonium hydroxide is dropped into the solution to cause coprecipitation, for example. Thereafter, the precipitate is separated from the solution, and washing and drying thereof are performed.

Then, the dried precipitate is calcined in an oxidizing atmosphere. The temperature of the calcination is set, for example, within a range of 400° C. to 600° C. Further, the calcined product is crushed, and then fired in an oxidizing atmosphere. The temperature of the firing is set, for example, within a range of 700° C. to 1,000° C. Thus, the supports 11 are obtained.

Next, the supports 11 are dispersed into a solution of a precious metal salt, and then the dispersion liquid is filtrated. Subsequently, drying and firing of the filter cake are performed in this order. The temperature of the firing is set, for example, within a range of 300° C. to 70° C. Thus, the precious metal is supported by the supports 11.

Then, the supports 11 supporting the precious metal are added into a solution of an alkaline-earth salt. Further, the slurry is heated to sufficiently remove liquid. Thus, the alkaline-earth element is supported by the supports 11.

There is no limit on the method of loading the supports 11 with the alkaline-earth element. For example, a method of impregnating supports supporting a precious metal with a solution of an alkaline-earth salt, a method utilizing coprecipitation, a method using an alkoxide of an alkaline-earth metal, etc. can be utilized.

Thereafter, the supports 11 supporting the precious metal and the alkaline-earth element are fired in an oxidizing atmosphere. The temperature of the firing is set, for example, within a range of 700° C. to 1,000° C. Thus, the solid solutions of the precious metal and the composite oxides 12a to 12 in addition to the composite oxides 12a to 12c are produced so as to obtain the second particles P2 supporting the precious metals 13a.

In the case where the precious metals 13c are supported by the first particles P1, the first particles P1 are dispersed into a solution of the precious metal and the dispersion liquid is filtrated. Subsequently, drying and firing of the filter cake are performed in this order. The temperature of the firing is set, for example, within a range of 300° C. to 700° C. Thus, the precious metals 13c are supported by the first particles P1.

After that, the first particles P1 and the second particles P2 are mixed together. Thus, the oxygen storage material 1 is obtained.

Example of the present invention will be described below.

Example 1

First, powder A was prepared by the following method.

Cerium nitrate [$Ce(NO_3)_3$], zirconium oxynitrate [$ZrO(NO_3)_2$] and yttrium nitrate [$Y(NO_3)_3$] were dissolved into 500 mL of deionized water. A molar ratio of cerium nitrate, zirconium oxynitrate and yttrium nitrate was 100:90:20.

An aqueous ammonium solution prepared by dissolving 51 g of ammonia ($NH_3$) into 1 L of deionized water was dropped into the above solution at an ambient temperature so as to cause coprecipitation. Subsequently, the aqueous solution was stirred for 60 minutes. Then, the aqueous solution was filtrate, and the filter cake was sufficiently washed using deionized water. The precipitation product thus obtained was dried at 110° C.

Then, the precipitation product was calcined at 500° C. for 3 hours in the atmosphere. After that, the calcined product was crushed using a mortar, and the powder thus obtained was fired at 800° C. for 5 hours in the atmosphere.

A part of the powder thus obtained was taken and subjected to X-ray diffraction analysis. As a result, it was proved that the powder was made of a composite oxide represented by a chemical formula $(Ce,Zr,Y)O_2$. Note that the specific surface area of the powder was 98 $m^2/g$.

Then, 50 g of the powder was weighed and added into 500 mL of deionized water. The powder was well dispersed in the deionized water by performing 10 minutes of ultrasonic agitation. Subsequently, a solution of dinitrodiamine platinum nitrate was added to the slurry. The concentration and amount of the dinitrodiamine platinum nitrate solution were adjusted such that the platinum content in the powder A would be 0.5% by weight.

After that, the slurry was filtrated under suction. The filtrate was subjected to inductively coupled plasma (ICP) spectrometry. As a result, it was revealed that the filter cake contained almost the entire platinum in the slurry.

Next, the filter cake was dried at 110° C. for 12 hours. Then, it was fired at 500° C. for 1 hour in the atmosphere. Thus, the powder A was obtained.

Next, powder B was prepared by the following method.

Cerium nitrate $[Ce(NO_3)_3]$ and zirconium oxynitrate $[ZrO(NO_3)_2]$ were dissolved into 500 mL of deionized water. A molar ratio of cerium nitrate and zirconium oxynitrate was 100:100.

An aqueous solution of ammonium hydroxide ($NH_4OH$) with a concentration of 10% by weight was dropped into the above solution at an ambient temperature so as to cause coprecipitation. Subsequently, the aqueous solution was stirred for 60 minutes. Then, the aqueous solution was filtrate, and the filter cake was sufficiently washed using deionized water. The precipitation product thus obtained was dried at 110° C.

Then, the precipitation product was calcined at 500° C. for 3 hours in the atmosphere. After that, the calcined product was crushed using a mortar, and the powder thus obtained was fired at 800° C. for 5 hours in the atmosphere.

The crystal structure of the powder thus obtained was analyzed using an X-ray diffractometer. As a result, it was proved that the powder was made of a composite oxide of cerium and zirconium. Note that the specific surface area of the powder was 90 $m^2/g$.

Then, 50 g of the powder was weighed and added into 500 mL of deionized water. The powder was well dispersed in the deionized water by performing 10 minutes of ultrasonic agitation. Subsequently, a solution of dinitrodiamine platinum nitrate was added to the slurry. The concentration and amount of the dinitrodiamine platinum nitrate solution were adjusted such that the platinum content in the powder B would be 0.5% by weight.

After that, the slurry was filtrated under suction. The filtrate was subjected to inductively coupled plasma (ICP) spectrometry. As a result, it was revealed that the filter cake contained almost the entire platinum in the slurry.

Next, the filter cake was dried at 110° C. for 12 hours. Then, it was fired at 500° C. for 1 hour in the atmosphere. Thus, platinum was supported by the powder made of the composite oxide of cerium and zirconium.

Subsequently, barium acetate was dissolved into 100 mL of deionized water. Then, 50 g of the powder, which was made of the composite oxide of cerium and zirconium, supporting platinum was weighed and added into the barium acetate solution. Note that the concentration of the barium acetate solution was adjusted such that the atomic ratio of the sum of cerium and zirconium to barium in the powder B would be 100:10. Subsequently, the dispersion liquid was heated so as to remove water. Thus, the barium compound was further supported by the powder, which was made of the composite oxide of cerium and zirconium, supporting platinum.

Next, the powder supporting platinum and the barium compound was fired at 1,000° C. for 3 hours in the atmosphere. Thus, the powder B was produced.

A part of the powder B was taken and subjected to X-ray diffraction analysis. As a result, it was proved that the powder B contained a composite oxide represented by a chemical formula $BaZrO_3$, a composite oxide represented by a chemical formula $Ba(Ce,Zr)O_3$, and a composite oxide represented by a chemical formula $BaCeO_3$.

Then, a part of the powder B was taken and immersed for 12 hours in an aqueous solution of hydrogen fluoride (HF/$H_2O$=1/10) held at an ambient temperature. Note that this condition allowed almost only the barium-containing composite oxide of the powder B to be dissolved. Subsequently, the solution was filtrated, and the filtrate was subjected to ICP spectrometry. As a result, the platinum content of the filtrate revealed that 45% of platinum formed the solid solution, in other words, the solid solution-forming ratio was 45%.

Next, the powder A and the powder B were mixed using a mortar. The weight ratio of the powder A to the powder B was 70:30. Hereinafter, the mixture will be referred to as powder AB1.

The powder AB1 was subjected to X-ray diffraction analysis. Further, a microphotograph of the powder AB1 was taken, and an elementary analysis utilizing energy-dispersive X-ray diffraction (EDX) was performed.

Figure 3:
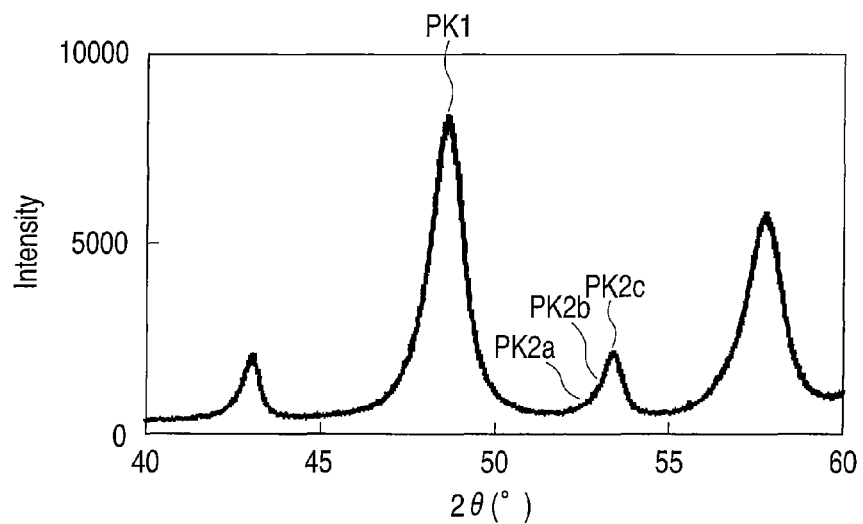
FIG. 3 is a graph showing an X-ray diffraction spectrum obtained for the powder manufactured in Example 1.

FIG. 3 is a graph showing an X-ray diffraction spectrum obtained for the powder AB1. In the figure, the abscissa denotes the diffraction angle, while the ordinate denotes the diffracted intensity. Also, the reference symbol PK1 indicates the position of the diffraction peak originated from the powder A, while the reference symbols PK2a to PK2c indicate the positions of the diffraction peaks originated from the powder B.

Figure 4:
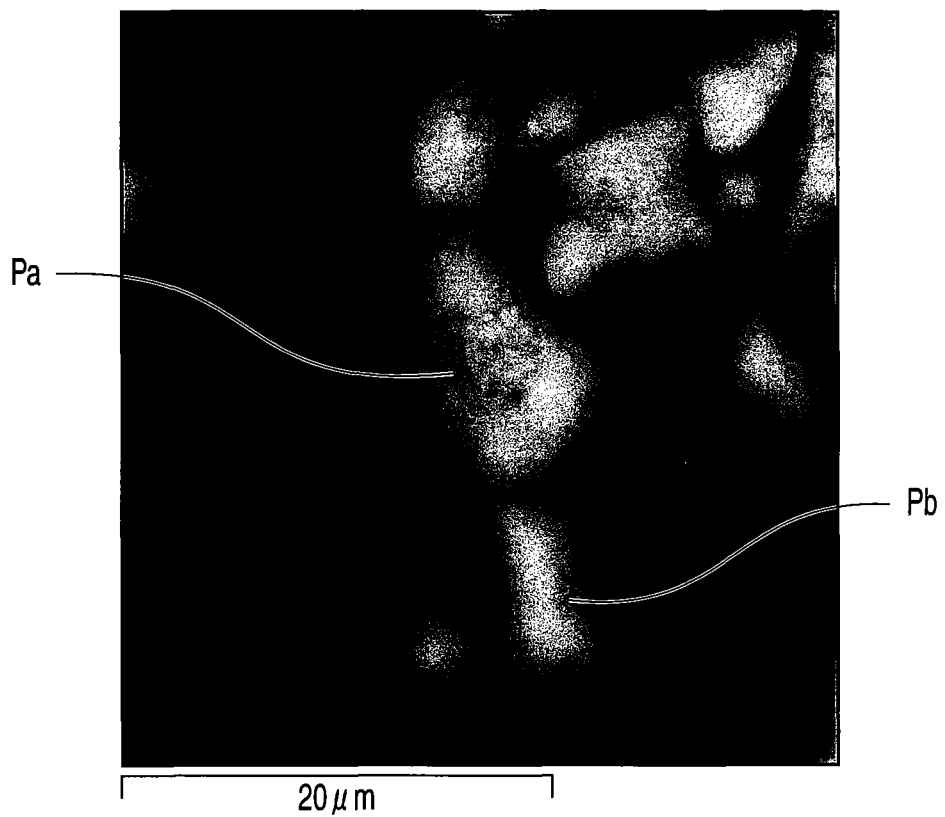
FIG. 4 is an electron micrograph of the power manufactured in Example 1.

FIG. 4 is an electron micrograph of the power AB1. FIG. 5 is a graph showing an elementary analysis spectrum obtained using EDX for the particle Pa shown in FIG. 4. FIG. 6 is a graph showing an elementary analysis spectrum obtained using EDX for the particle Pb shown in FIG. 4. In FIGS. 5 and 6, the abscissa denotes the energy of characteristic X-ray, while the ordinate denotes the intensity of the characteristic X-ray.

The metal elements contained in powder, the crystal structure of the powder, etc. can be identified, for example, by performing the above determinations. Further, a particle in which a precious metal and a composite oxide form a solid solution can be identified, for example, by performing the observation of the state change described with reference to FIG. 2.

Example 2

The powder A and the powder B were mixed together using a mortar. The weight ratio of the powder A to the powder B was 90:10. Hereinafter, the mixture will be referred to as powder AB2.

Example 3

The powder A and the powder B were mixed together using a mortar. The weight ratio of the powder A to the powder B was 50:50. Hereinafter, the mixture will be referred to as powder AB3.

Example 4

The powder A and the powder B were mixed together using a mortar. The weight ratio of the powder A to the powder B was 30:70. Hereinafter, the mixture will be referred to as powder AB3.

The endurances of the powder A, B and AB1 to AB4 were tested by the following method.

First, 10 g was weighed for each of the powders A, B and AB1 to AB4 and set in a flow-type endurance test apparatus, and then, a gas containing nitrogen as a main component was made to flow through the apparatus at a flow rate of 1,000 mL/minute for 20 hours. The temperature of the powder was held at 1,100° C. As the gas made to flow through the apparatus, a lean gas prepared by first adding oxygen to nitrogen at a concentration of 5% and further adding water vapor to the mixed gas at a concentration of 10%, and a rich gas prepared by first adding carbon monoxide to nitrogen at a concentration of 10% and further adding water vapor to the mixed gas at a concentration of 10% were used. The lean gas and the rich gas were switched at intervals of 5 minutes.

Next, 15 mg was weighed for each of these powders and placed on a platinum dish. Then, the temperature of each powder was raised to 500° C. and kept at 500° C. for 40 minutes while circulating air at a flow rate of 200 mL/minute. After that, the weight of each powder was measured. Then, a reducing gas prepared by adding hydrogen to nitrogen at a concentration of 10% was circulated at a flow rate of 150 mL/minute for 90 minutes while each powder was kept at 500° C. After that, the weight of each powder was measured.

The difference between the weight ($\mu$g) of the powder before circulating the reducing gas and the weight ($\mu$g) of the powder after circulating the reducing gas was calculated. Further, the difference ($\mu$g) was divided by the weight (mg) of the powder before circulating the reducing gas so as to obtain the amount of stored oxygen ($\mu$g/mg) per unit weight of the powder. The amount of stored oxygen obtained for each powder is summarized in the table below.

| Powder | Composition (wt %) | | Amount of stored oxygen ($\mu$g/mg) |
| --- | --- | --- | --- |
| | Powder A | Powder B | |
| AB1 | 70 | 30 | 12 |
| AB2 | 90 | 10 | 9 |
| AB3 | 50 | 50 | 10 |
| AB4 | 30 | 70 | 8 |
| A | 0 | 100 | 4 |
| B | 100 | 0 | 6 |

As shown in the above table, the powders AB1 to AB4 were larger in amount of stored oxygen as compared with the powders A and B. That is, the powders AB1 to AB4 delivered an excellent oxygen storage capacity in the case where used for a long period of time under high temperature conditions as compared with the powders A and B.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An oxygen storage material comprising:
 a first particle made of a first composite oxide consisting essentially of oxygen, cerium and zirconium or a second composite oxide consisting essentially of oxygen, cerium, a first rare-earth element other than cerium and zirconium;
 a second particle including a third composite oxide of a second rare-earth element, an alkaline-earth element and zirconium, the second particle further including a support supporting the third composite oxide and containing an oxide of the second rare-earth element as a main component; and
 a precious metal, a part of the precious metal forming a solid solution with the third composite oxide included in the second particle,
 wherein the weight ratio of the first particle with respect to the second particle is within a range of 80/20 to 40/60.

2. The oxygen storage material according to claim 1, wherein of the composite oxides of the first and second particles, only the third composite oxide included in the second particle forms the solid solution with the precious metal.

3. The oxygen storage material according to claim 1, wherein the second particle includes a composite oxide of cerium, an alkaline-earth element and zirconium or a composite oxide of cerium, a rare-earth element other than cerium, an alkaline-earth element and zirconium.

4. The oxygen storage material according to claim 1, wherein the second particle includes a composite oxide of cerium, barium and zirconium.

5. The oxygen storage material according to claim 1, wherein another part of the precious metal is supported by the first particle.

6. The oxygen storage material according to claim 5, wherein still another part of the precious metal is supported by the second particle.

7. The oxygen storage material according to claim 6, wherein the second particle includes a composite oxide of cerium, an alkaline-earth element and zirconium or a composite oxide of cerium, a rare-earth element other than cerium, an alkaline-earth element and zirconium.

8. The oxygen storage material according to claim 6, wherein the second particle includes a composite oxide of cerium, barium and zirconium.

9. An oxygen storage material comprising:
 a first particle made of a first composite oxide consisting essentially of oxygen, cerium and zirconium or a second composite oxide consisting essentially of oxygen, cerium, a first rare-earth element other than cerium and zirconium;
 a second particle including a third composite oxide consisting essentially of oxygen, cerium, an alkaline-earth element and zirconium, the second particle further including a support supporting the composite oxide of cerium and containing an oxide of cerium as a main component; and
 a precious metal, a part of the precious metal forming a solid solution with the third composite oxide included in the second particle,
 wherein the weight ratio of the first particle with respect to the second particle is within a range of 80/20 to 40/60.

10. An oxygen storage material comprising:
 a first particle made of a first composite oxide consisting essentially of oxygen, cerium and zirconium or a second composite oxide consisting essentially of oxygen, cerium, a first rare-earth element other than cerium and zirconium;
 a second particle including a third composite oxide of a second rare-earth element, an alkaline-earth element, cerium and zirconium, the second particle further including a support supporting the third composite oxide and containing an oxide of the second rare-earth element as a main component; and a precious metal, a part of the precious metal forming a solid solution with the third composite oxide included in the second particle, wherein the weight ratio of the first particle with respect to the second particle is within a range of 80/20 to 40/60.

* * * * *